No. 877,213. PATENTED JAN. 21, 1908.
A. MILL.
SPEED CHANGING MECHANISM.
APPLICATION FILED JULY 1, 1907.
2 SHEETS—SHEET 1.
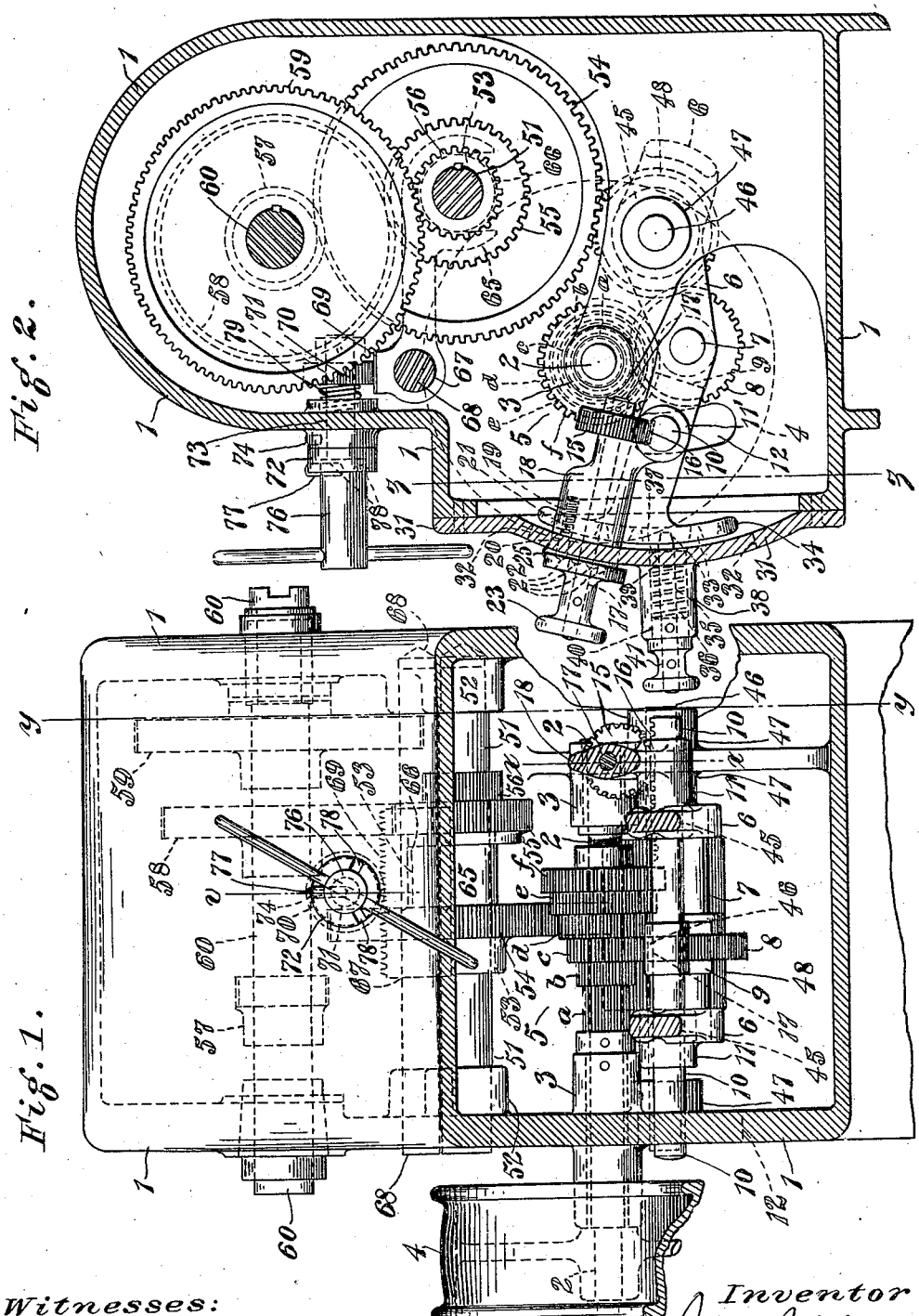
Witnesses:
Inventor
By
Attorney

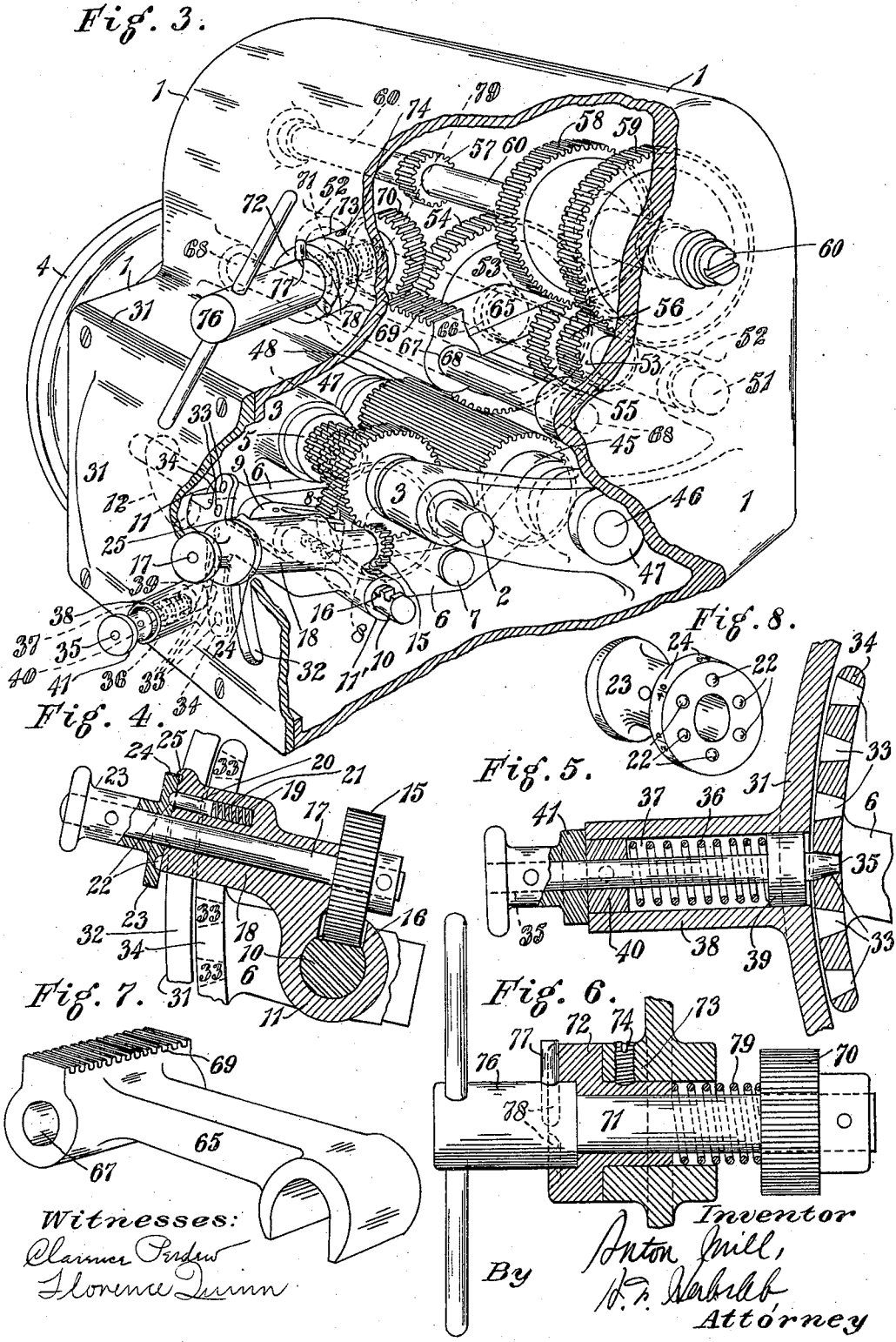

UNITED STATES PATENT OFFICE.

ANTON MILL, OF CINCINNATI, OHIO, ASSIGNOR TO THE HILBERT MACHINE COMPANY, OF CINCINNATI, OHIO, A CORPORATION OF OHIO.

SPEED-CHANGING MECHANISM.

No. 877,213.  Specification of Letters Patent.  Patented Jan. 21, 1908.

Application filed July 1, 1907. Serial No. 381,699.

*To all whom it may concern:*

Be it known that I, ANTON MILL, a citizen of the United States, residing at Cincinnati, in the county of Hamilton and State of Ohio, have invented certain new and useful Improvements in Speed-Changing Mechanism, of which the following is a specification.

It is the object of my invention to provide a new and improved speed changing mechanism which is compact in form and capable of a large number of changes with few gears and working parts, and the invention will be readily understood from the following description and claims, and from the drawings, in which latter:

Figure 1 represents a front elevation of my improved device, with the speed-box in section on the line $z$—$z$ of Fig. 2. Fig. 2 is a cross-section of my improved device on the line $y$—$y$ of Fig. 1. Fig. 3 is a perspective view of my improved device, with the gear-box broken away in parts for better illustration of the mechanism. Fig. 4 is a detail of the handle for the rocker-frame in section on a line corresponding to the line $x$—$x$ of Fig. 1. Fig. 5 is a detail in section of the locking means for the rocker-frame. Fig. 6 is a detail of the shifting handle for the slidable series of diversely-sized gears, in section on the line $v$—$v$ of Fig. 1. Fig. 7 is a perspective view of the rack-arm for the slidable series of diversely-sized gears; and Fig. 8 is a rear perspective view of the revoluble handle for the rocker-frame.

1 represents a gear-box or casing, which may be of suitable form, depending on the relation in which the speed changing mechanism is to be employed, it being understood that the same is applicable for providing variable speeds or variable feeds, for instance, in machine tools, such as lathes, milling machines or the like, and the same may also be employed in other relations.

2 is the driving-shaft and is shown journaled in suitable bearings 3. It has a prime-mover connected therewith, which is shown as a pulley 4. The shaft 2 has thereon a nest 5 of diversely-sized gears, shown as a cone of gears, which is rigid with relation to the shaft.

6 is a tumbler, shown as a rockable frame, in which there is a shaft 7, upon which latter a gear 8 is adapted to be sidewardly adjusted for being placed opposite the respective gears of the nest of gears 5, there being six of these latter gears shown, as $a$ $b$ $c$ $d$ $e$ $f$, although there may be a greater or less number of the same. The gear 8 is shifted laterally of the shaft by having the tines of a fork 9 at either side of the gear 8, the fork being secured to a rod 10 which slides longitudinally in bearings 11 11' of the tumbler-frame 6. A slot 12 in the side of the gear-box provides clearance for rocking the rod. The longitudinal movement of the rod 10 is induced by a pinion 15 meshing with a rack 16 on the rod. The pinion 15 is on a shaft 17 journaled in a bearing 18 adjacent the bearing 11' on the tumbler-frame. In the bearing 18 there is a bore 19 in which there is a plug 20, backed by a spring 21 for forcing the end of the plug, which is provided with a blunt point, into any one of a series of recesses 22 at the back of a handle 23 on the shaft 17. The handle 23 is employed for turning the shaft 17 and also for raising and lowering the swinging end of the tumbler-frame 6. The number of recesses 22 corresponds with the number of gears of the cone of gears 5 and these recesses are so located as to arrest the rotation of the handle 23 when the gear 8 is respectively opposite the gears of the nest of gears 5. Adjacent each of the recesses 22 there is also the mark of a gage 24 on the periphery of the handle 23, the marks being caused to register with a pointer 25 on the bearing 18.

At the front of the gear-box there is a plate 31 in which there is an upright slot 32 through which the bearing 18, which forms an extension of the tumbler-frame, extends and along which slot the said bearing or the handle may be moved up and down for rocking the tumbler-frame so as to cause the gear 8 to properly mesh with the teeth of any one of the gears of the nest of gears 5, it being understood that greater or less movement of the tumbler-frame is required according to the diameter of the gear which is to be engaged. For properly positioning the rocking gear after engagement, the front of the tumbler-frame is provided with apertures 33 corresponding in number to the number of gears in the cone of gears 5. These apertures are preferably in a locking-piece or arc 34 at the front of the tumbler-frame. A pin 35 is adapted to take into any of the selective apertures 33 when the gear 8 is in proper mesh with its mating gear. This pin is shown spring-pressed by a spring 36 in a bore 37 of a lug 38 on the plate 31, the spring bearing against a shoulder 39 on the pin and against a collar 40 secured in the lug, in which collar the pin slides, the outer end of the pin having a handle 41 secured thereto. The pin is disengaged by pulling on the handle.

If it is desired to selectively engage the gear 8 with one of the gears of the cone of gears, the pin 35 is first pulled outwardly for releasing the tumbler-frame, the swinging end of which is then lowered, as by the handle 23, thus bringing the extension of the tumbler-frame to lowermost position in the slot 32 and the gear 8 out of range of all the gears of the cone of gears 5. The handle 23 is then turned for shifting the gear 8 sidewardly, the position of this gear being noted on the gage 24. When the gear 8 is brought to proper position opposite the selective gear of the nest of gears, which proper position is also indicated by the resistance of the plug 20 in the proper recess 22, the handle 23 is raised, for instance, with the right hand, for bringing the gear 8 into proper mesh with its mating gear in the cone of gears 5, while the left hand of the operator is free to manipulate the pull-pin 35 for releasing the said pull-pin for permitting swinging of the tumbler-frame and for proper engagement of said pull-pin with its proper aperture 33, thus affording very conveniently operated mechanism.

The tumbler-frame is shown pivoted by bearings 45 about a shaft 46 mounted in bearings 47. An elongated gear 48 is provided on this shaft, the gear 8 being in mesh with this elongated gear in its various positions opposite any of the gears of the cone of gears 5. The elongated gear 8 is driven at various speeds dependent on the peripheral speeds of the respective gears of the nest of gears, six of these speeds being imparted to the elongated gear in the present exemplification of my invention.

51 is a shaft in bearings 52. On this shaft a sleeve 53 has longitudinal adjustment. This sleeve carries a series of gears. In the present exemplification there are three of these gears, 54 55 and 56, on the sleeve, these gears being of different diameters. They are adapted to be selectively engaged with gears 57 58 and 59 secured to a shaft 60, which, in the present exemplification, is the driven shaft. The gears 57 58 59 form a second series of gears, these series of gears each comprising diversely-sized gears. A yoke 65 is received in an annular recess 66 of the sleeve 53 and has a bearing 67 on a shaft 68. Suitable means are provided for shifting the yoke laterally and thereby shifting the gears 54 55 56 into meshing engagement respectively with the gears 57 58 59, the said gears being properly spaced apart for permitting this to be done. For shifting the yoke 65 I have provided it with a rack 69, with which a pinion 70 meshes, the pinion being on a shaft 71 journaled in a bushing 72 secured in a bearing 73 by a set-screw 74. A handle 76 is provided for the shaft 71, the hub of which has a pin 77 adapted to selectively engage suitable recesses 78 in the end face of the bushing 72, these recesses corresponding with the position which the pin 77 attains when the gears 54 55 56 are respectively opposite the gears 57 58 59 for insuring correct meshing of those gears. A spring 79 may be interposed between the inner end of the bushing 72 and the pinion 70 for normally causing engagement of the pin in the respective recesses. The pinion 70 is secured to the shaft 71.

From the driven shaft motion may be suitably imparted to other or further mechanism, or this driven shaft may be the spindle of a lathe or milling machine or other driven part which it is desired to operate. In the present exemplification the various speeds of the elongated gear 48 are multiplied by three through the medium of the gears 54 57 or 55 58 or 56 59, and further multiplications may be obtained by increasing the number of said gears. The elongated gear 48 is shown as an idler-gear and receives motion by a gear slidable therealong at one side thereof and transmits motion by another gear also slidable therealong at the other side thereof, thus receiving and transmitting motion by gears slidable across its face.

Having thus fully described my invention what I claim as new and desire to secure by Letters Patent is:

1. In a speed changing mechanism, the combination of a rockable frame, a gear slidable laterally on said frame, and a rotatable handle mounted for movement transverse of its rotary axis and having connection with said frame and gear for sliding said gear by the turning of said handle and rocking said frame by said transverse movement of said handle.

2. In speed changing mechanism, the combination of an elongated gear, a rockable frame pivoted about the rotary axis of the latter, a nest of diversely-sized gears, a slidable gear on said rockable frame operative between said elongated gear and nest of gears, and a handle rotatively journaled on said rockable frame and having connection with said slidable gear and arranged for sliding said slidable gear by the turning of said handle and rocking said frame by the movement of said handle transversely of its rotary axis.

3. In speed changing mechanism, the combination of a train of gearing comprising a plurality of nests of diversely-sized gears, a sidewardly slidable gear and an elongated gear, said sidewardly slidable gear and one of said nests meshing with said elongated gear and means for moving said last-named nest and said slidable gear sidewardly, said means comprising racks and pinions and longitudinally movable handles for the latter, substantially as described.

4. In speed changing mechanism, the combination of a gear-box, a rockable frame therein, a slidable gear on said rockable frame, a handle for sliding said gear and rocking said frame, said rockable frame comprising a locking-piece, and a shifting pin on said box coöperating with said locking-piece for locking said rockable frame in selective position into which the same has been swung by said handle, substantially as described.

5. In speed changing mechanism, the combination of an elongated idler gear and a plurality of gears in mesh therewith and slidable therealong for imparting motion to said elongated gear and receiving motion from said elongated gear, substantially as described.

6. In speed changing mechanism, the combination of a nest of diversely-sized gears, an elongated gear, a rocker-frame having a pivotal axis coincident with the rotary axis of said elongated gear, a rotatable handle for rocking said frame a gear slidable laterally on said rocker-frame in mesh with said elongated gear and having connection with said rotatable handle and adapted to be placed opposite any of the gears by the rotation of said handle of said nest of diversely-sized gears, and means for locking said rockable frame, and constructed and arranged for causing the meshing of said laterally slidable gear with any of the gears of said nest of diversely-sized gears opposite to which it has been placed.

7. In speed changing mechanism, the combination with a nest of diversely-sized gears, an elongated gear, a rocker-frame having a pivotal axis coincident with the rotary axis of said elongated gear, a gear slidable laterally on said rocker-frame in mesh with said elongated gear and adapted to be placed opposite any of the gears of said nest of diversely-sized gears, and means for rocking said rocker-frame and locking the same in position for causing the meshing of said laterally slidable gear with any of the gears of said nest of diversely-sized gears, a series of diversely-sized gears nested together and having meshing engagement with said elongated gear, and a second series of diversely-sized gears, and means for causing meshing engagement with any pair of said series of diversely-sized gears, substantially as described.

8. In speed changing mechanism, the combination of a nest of diversely-sized gears, an elongated gear, an intermediate gear in mesh with said elongated gear, a rocker-frame and a rotatable handle on said rocker-frame mounted for movement transverse of its rotary axis for rocking said rocker-frame by said last-named movement, and having operative connection with said intermediate gear for moving the same by its rotative movement laterally opposite any of the gears of said nest of diversely-sized gears.

9. In a speed-changing mechanism, the combination of a nest of diversely-sized gears, an elongated gear, an intermediate gear in mesh with said elongated gear, a rocker-frame, a handle on said rocker-frame for rocking said rocker-frame and having operative connection with said intermediate gear for moving the same laterally opposite any of the gears of said nest of diversely-sized gears, said rocker-frame having a positioning-piece thereon, and engaging means for said positioning-piece for locking the rocker-frame in position of engagement of said intermediate gear with any of said diversely-sized gears, substantially as described.

10. In a speed changing mechanism, the combination with a gear box provided with a plate having an upright slot therein, of a nest of diversely-sized gears, an elongated gear, a rocker-frame, an intermediate gear on said rocker-frame in mesh with said elongated gear, and a handle for rocking said rocker-frame movable in said slot and rockable about its axis in said slot and having operative engagement with said sliding gear for shifting the same laterally opposite any of the gears of said nest of gears.

11. In a speed changing mechanism, the combination of an elongated gear, a rocker-frame having a rocking-axis coincident with the rotary axis of said elongated gear, a nest of diversely-sized gears, an intermediate gear normally in mesh with said elongated gear, a longitudinally slidable rod on said rocker-frame, a fork thereon having operative engagement with said intermediate gear, said longitudinally slidable rod having a rack thereon, a pinion engaging said rack, and a handle on said rocker-frame for operating said pinion, substantially as described.

12. In speed changing mechanism, the combination of an elongated gear, a rocker-frame having a rocking-axis coincident with the rotary axis of said elongated gear, a nest of diversely-sized gears, an intermediate gear normally in mesh with said elongated gear, a longitudinally slidable rod on said rocker-frame, a fork thereon having operative engagement with said intermediate gear, said longitudinally slidable rod having a rack thereon, a pinion engaging said rack, a handle on said rocker-frame for operating said pinion, said rocker-frame having a locking-piece thereon, and locking means for the latter, substantially as described.

13. In speed changing mechanism, the combination of an elongated gear, a nest of diversely-sized gears, a laterally movable intermediate gear in mesh with said elongated gear, and means for shifting said elongated gear laterally comprising a handle for said rocker-frame, said handle journaled in said rocker-frame, a gear thereon, a longitudinally slidable rod having operative engagement with said intermediate gear, said laterally slidable rod having a rack thereon in mesh with said pinion, substantially as described.

14. In speed changing mechanism, the combination of an elongated gear, a nest of diversely-sized gears, a laterally movable intermediate gear in mesh with said elongated gear, means for shifting said elongated gear laterally comprising a handle for said rocker-frame, said handle journaled in said rocker-frame, a gear thereon, a longitudinally slidable rod having operative engagement with said intermediate gear, said laterally slidable rod having a rack thereon in mesh with said pinion, said handle having a gage and indentations corresponding with the markings of said gage, and a yielding plug on said rocker-frame for engaging said indentations and definitely positioning said longitudinally slidable rod, substantially as described.

15. In speed changing mechanism, the combination of an elongated gear, a nest of diversely-sized gears, a laterally movable intermediate gear in mesh with said elongated gear, means for shifting said intermediate gear laterally comprising a handle for said rocker-frame, said handle journaled in said rocker-frame, a gear thereon, a longitudinally slidable rod having operative engagement with said intermediate gear, said laterally slidable rod having a rack thereon in mesh with said pinion, said rocker-frame having a locking-piece thereon provided with recesses, and a pull-pin arranged to engage said respective recesses for causing proper meshing between said intermediate gear and the gears of said nest of diversely-sized gears, substantially as described.

16. In speed changing mechanism, the combination of a driving shaft, a nest of diversely-sized gears thereon, an elongated gear, an intermediate gear in mesh with the latter, means for rocking said intermediate gear and sliding the same laterally for causing meshing engagement between said intermediate gear and the gears of said nest of diversely-sized gears, a second nest of gears in meshing connection with said elongated gear, a third nest of diversely-sized gears, and means for sliding one of said last two nests of diversely-sized gears for causing meshing engagement between any of the pairs of said last two nests of diversely-sized gears, substantially as described.

17. In speed changing mechanism, the combination of a driving shaft, a nest of diversely-sized gears thereon, an elongated gear, an intermediate gear in mesh with the latter, means for rocking said intermediate gear and sliding the same laterally for causing meshing engagement between said intermediate gear and the gears of said nest of diversely-sized gears, a second nest of gears in meshing connection with said elongated gear, a third nest of diversely-sized gears, and means for sliding one of said last two nests of diversely-sized gears for causing meshing engagement between any of the pairs of said last two nests of diversely-sized gears, said last-named means comprising a yoke for shifting said sleeve sidewardly, said sleeve having a rack thereon, a pinion engaging said rack, a bearing for said pinion having notches at its end-face, a handle in operative engagement with said pinion, and a pin on said handle selectively engaging said respective notches, for the purpose specified.

18. In speed changing mechanism, the combination with a gear-box having a releasable front plate, of a nest of diversely-sized gears, an elongated gear, and an intermediate gear in said gear-box, a rocker-frame having a rocking axis coincident with the rotary axis of said elongated gear, a shaft therein for supporting said intermediate gear, a longitudinally movable rod, said front plate having a slot, a rotary handle connected with said rocker-frame through said slot and having engagement with said longitudinally movable rod for moving said intermediate gear laterally and permitting rocking of said rocker-frame.

19. In a speed changing mechanism, the combination with a gear-box having a releasable front plate, of a nest of diversely-sized gears, an elongated gear, and an intermediate gear in said gear-box, a rocker-frame having a rocking axis coincident with the rotary axis of said elongated gear, a shaft on said rocker-frame for supporting said intermediate gear, a longitudinally movable rod, said front plate having a slot, a rotary handle connected with said rocker-frame through said slot and having engagement with said longitudinally movable rod for moving said intermeidate gear laterally and for rocking of said rocker-frame, said rocker-frame having recesses at its forward-end, and a pull-pin mounted on said front plate and arranged to engage said recesses for causing proper mesh between said intermediate gear and any one of said nest of diversely-sized gears, substantially as described.

In testimony whereof I have subscribed my name hereto in the presence of two subscribing witnesses.

ANTON MILL.

Witnesses:
 VINCENT H. BECKMAN,
 FLORENCE QUINN.